United States Patent [19]

Anderson et al.

[11] Patent Number: 6,157,816
[45] Date of Patent: Dec. 5, 2000

[54] METHOD OF INCREASING BATTERY LIFE IN MOBILE COMMUNICATIONS DEVICES WHICH USE PAGING CHANNEL DISPLACEMENT

[75] Inventors: Keith William Anderson, Durham; Brian Burdette, Apex, both of N.C.

[73] Assignee: Ericsson Inc., Research Triangle Park, N.C.

[21] Appl. No.: 08/996,079

[22] Filed: Dec. 22, 1997

[51] Int. Cl.⁷ .............. H04B 7/00; H04B 1/38; H04B 1/16

[52] U.S. Cl. .......... 455/38.3; 455/343; 455/574; 370/311

[58] Field of Search .................. 455/574, 38.1, 455/38.3, 343, 517; 370/311, 321, 326, 337, 347, 468, 498

[56] References Cited

U.S. PATENT DOCUMENTS

| | | | |
|---|---|---|---|
| 4,964,121 | 10/1990 | Moore | 370/311 |
| 5,224,152 | 6/1993 | Harte | 455/574 |
| 5,511,110 | 4/1996 | Drucker | 455/458 |
| 5,625,629 | 4/1997 | Wenk | 370/347 |
| 5,629,940 | 5/1997 | Gaskill | 370/311 |
| 5,752,201 | 5/1998 | Kivari | 455/574 |
| 5,826,173 | 10/1998 | Dent | 455/38.3 |
| 5,875,187 | 2/1999 | Amin et al. | 370/337 |
| 5,918,170 | 6/1999 | Oksanen et al. | 455/343 |
| 5,930,706 | 7/1999 | Raith | 455/422 |
| 5,978,366 | 11/1999 | Massingill et al. | 370/337 |
| 5,991,600 | 11/1999 | Anderson et al. | 455/38.3 |
| 5,991,635 | 10/1998 | Dent et al. | 455/517 |

FOREIGN PATENT DOCUMENTS

| | | |
|---|---|---|
| WO 95/12931 | 5/1995 | WIPO . |
| WO 97/20446 | 6/1997 | WIPO . |

OTHER PUBLICATIONS

Telecommunications Industry Association, TDMA Cellular/PCS—Radio Interface—Mobile Station—Base Station Compatibility—Digital Control Channel, Oct. 1996.

*Primary Examiner*—Reinhard J. Eisenzopf
*Assistant Examiner*—Charles N. Appiah
*Attorney, Agent, or Firm*—Wood, Phillips, VanSanten, Clark & Mortimer

[57] ABSTRACT

A mobile communications device such as a pager or a cellular telephone enters a low power state more promptly than under TIA/EIA/IS-136 standards when an incoming message is pending for the device but is delayed by a first message broadcast for another such device. The device calculates the number of frames or SPACH slots required under those standards for the message for the other device; if that number is more than that reserved for the message for itself then it powers down immediately until the next paging channel slot is to be received. If the number of frames or SPACH slots required for the message for the other device is the same as or less than that reserved for the message for itself, then the device powers down immediately only for the duration of the message for the other device. By so powering down, the device achieves great savings in battery power as compared to present practices, without delay in reading incoming signals directed to the device.

7 Claims, 2 Drawing Sheets

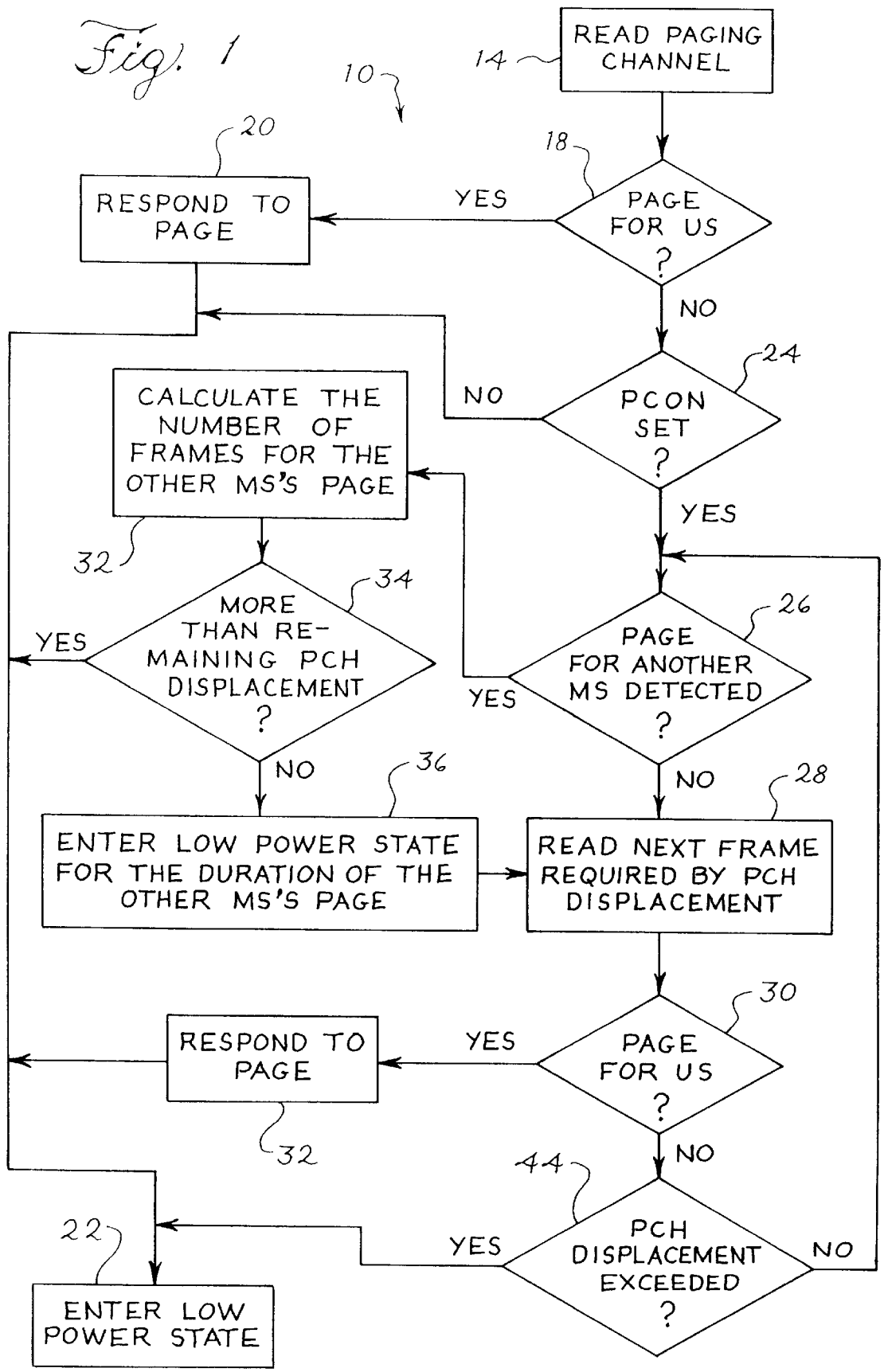

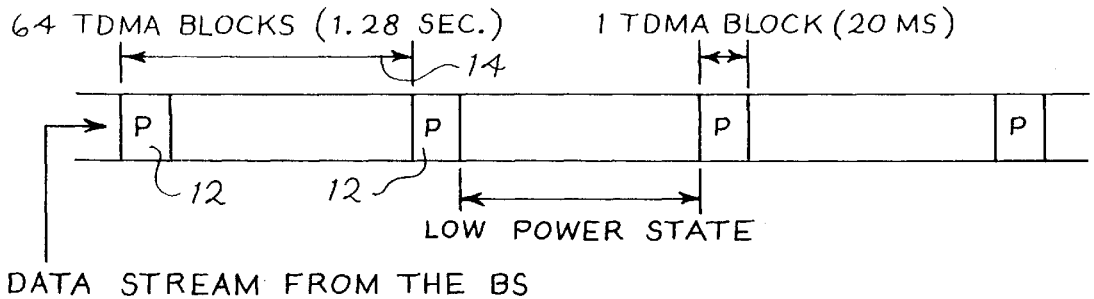
Fig. 2A (PRIOR ART)
Fig. 2B (PRIOR ART)
Fig. 2C (PRIOR ART)
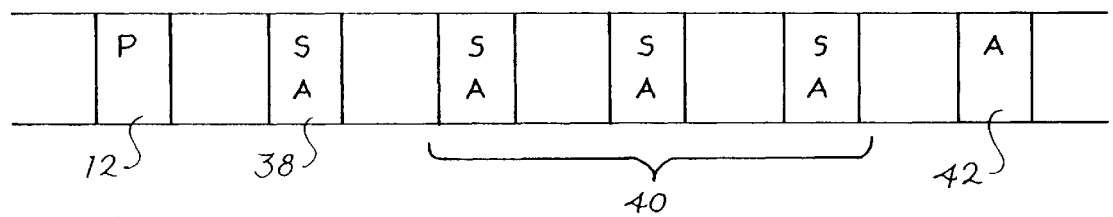
Fig. 3

METHOD OF INCREASING BATTERY LIFE IN MOBILE COMMUNICATIONS DEVICES WHICH USE PAGING CHANNEL DISPLACEMENT

BACKGROUND OF THE INVENTION

1. Field of the Invention

The present invention relates to mobile communications devices such as pagers and cellular telephones and to methods for increasing battery life, on any single charge, by reducing power draw by putting the device into standby operation sooner than IS-136 procedures otherwise call for.

2. Related Art

One of the main objectives of Industry Standard 136 of the Telecommunications Industry Association ("TIA") and the Electronic Industies Association ("EIA") is to improve battery savings in time division multiple access ("TDMA") mode digital mobile communications equipment, called "mobile stations". Battery savings is accomplished by reducing the time that the mobile station must read data among slots that are broadcast by a base station. Ideally, the mobile station needs to read, at full internal processing power, only one TDMA block of every 64 transmitted, thus for 0.02 second of each 1.28 second block, until it determines that a message is coming to it. See FIG. 2A. The device can "sleep" in a standby mode, at a low power state, for the remaining 1.26 seconds, or over 98.4% of the time, if no message is coming, yet be immediately ready to receive messages transmitted. If a paging frame class of greater than I is used by the base station, yet greater battery life is possible.

When more than five mobile stations require access simultaneously to messages from the base station, each mobile station must generally read more data of each TDMA block, draining its battery more quickly, if messages are not to be delayed in reaching the mobile station. Up to five mobile stations may use each TDMA block simultaneously without increasing battery drain in the mobile stations or delaying the sending of messages.

Paging Channel ("PCH") Displacement allows the base station to require each mobile station to read extra "SPACH" slots (SPACH is short for combined "Short message service", "Paging channel", and "Access response CHannel" communications modes or types), or "frames", in the broadcast transmission in order to determine what portions of a broadcast to greater than five mobile stations are being directed to the particular station. The base station's Page Continuation ("PCON") bit, in the Paging Channel slot, is received and read at full internal power by the mobile station once in every 64 TDMA blocks. If so directed by the PCON bit in the PCH Displacement signal, the mobile station then will also read additional SPACH slots, also at full internal power. See FIGS. 2B and 2C.

"Paging Channel Continuation" protocol is used to determine which SPACH slots or frames the mobile station should read in a broadcast transmission, i.e, those slots or frames that may be directed to it rather than to other mobile stations. The PCH continuation information is, by IS-136 standards, included in the first SPACH slot or frame in the series, if any (there usually are), in a message transmission, to direct the mobile station to the specific slots that it is to read. See FIG. 2C For example, as explained in section 4.8 of IS-136.1 Rev A (July 1966), a full-rate digital communications channel for a mobile station may have a PCH subchannel corresponding to a super frame phase ("SFP") of 27. Even if the mobile station determines there is no message directed to it, and if page continuation is set to 1 and the paging channel displacement to 4, it will nonetheless read SFP slots 29 and 31 (=27+4) in the primary superframe and also will read slots "n+1" and "n+3" in the next primary superframe, but receive no message for itself. See FIGS. 2B and 2C. Then the mobile station enters its low power state until the next occurrence of its assigned PCH subchannel. Reading these additional four slots reduces power savings from 98.4% (63/64ths) to 92.2% (59/64ths), or increases power consumption by about 400% over the resting state.

SUMMARY OF THE INVENTION

The present invention reduces the time that a mobile station device must draw power at a high internal rate in order to read signals that it actually does not need to read other than to keep up with the signal chain from the base station. When the mobile station is awaiting a message of a certain frame length inside a given TDMA block, it needs to read only the first SPACH slot or frame after the paging channel and determine, if the message is not immediately for that station, the number of frames following for a different mobile station. If that number exceeds the frame length for the message being awaited for the station, then the station enters the low power state until the next paging channel signal, in the next TDMA block. If that number does not exceed the frame length for the message being awaited, then the station enters the low power state just for the duration of the message for the other station.

BRIEF DESCRIPTION OF THE DRAWINGS

FIG. 1 is a block flow diagram of the power-saving logic of the present invention;

FIGS. 2A, B, and C are time flow diagrams of operation of the known IS-136 system; and FIG. 3 is a time flow diagram of operation of the IS-136 system using the invention.

THE PREFERRED EMBODIMENTS

The present invention decreases the battery draw of a mobile communications device or station, such as a pager or cellular telephone, by allowing the station to power down to a "sleep" mode during times that messages are being transmitted that contain no information for that station, particularly when message volumes from the central station are high.

In particular, FIG. 1 depicts the message processing and power states of a mobile communications device 10 made according to the invention, in flow chart form. In the TDMA ("Time Division Multiple Access") mode, the mobile device or station 10 first, at a high power level, reads a paging channel 12 (see also FIG. 2A), as at 14. The paging channel is one of 64 such channels, slots, or blocks 16 in the TDMA signal pattern, which has a repeating length of 1.28 seconds. If an incoming message from a base station (not shown) is determined at 18 to be for the particular mobile station 10, then station 10 will recognize that the page, for instance, is for it, and will record the message and respond as at 20 before entering the low power "sleep" state, at 22, for the remaining duration of that TDMA block. A longer sleep state can be arranged by the base station if it sets a paging frame class ("PFC") greater than 1, as is known in the art.

If the page or other message broadcast is not immediately for station 10, station 10 examines the page continuation ("PCON") bit in the paging channel 12, as at 24, to determine if any part of the following message is for that station 10. If the PCON bit is not set, indicating that no message follows for that station, then station 10 enters the low power state, as shown, also as known in the prior art. If the PCON bit is found at 24 to be set, indicating that a message for station 10 does follow, then station 10 will examine the beginning of the first SPACH slot transmitted and determine first if the message is for it or for another mobile station, as at 26. If the message is for station 10, then the frames of the message designated for station 10 by the paging channel displacement are read as at 28 and 30 and then responded to as required, as at 32. The mobile station 10 then enters the low power state until the next timed paging channel occurrence. This system and operation also are known in the prior art.

If, however, a page for another mobile station is detected at 26, as shown in FIG. 3, according to the present invention the mobile station 10 reads the first part of the next SPACH slot in the broadcast transmission. It then determines, as at 32, the number of frames or slots in the message for the other station. If the number of frames or slots in the incoming message is determined, at 34, to be greater than that remaining for the paging channel displacement of the message for the mobile station 10, then the station enters the low power state until the time for the next paging channel transmission. If the number of frames or slots in the incoming message for the other station is not greater than the remaining paging channel displacement of the message for the mobile station 10, then station 10 enters the low power state only for the duration of the other station's message.

Thus in FIG. 3, for example, station 10 first reads the paging channel 12 at full power and finds the PCON bit set (steps 14, 18, and 24 in FIG. 1) and the paging channel displacement field set to four. The station 10 then is set to read all of the next four SPACH slots of data, under IS-136. However, according to the invention, station 10 reads only the first of the next four SPACH slots to determine the paging channel displacement of that and the subsequent slots, since a message is sent only in sequential slots. If station 10 detects, at 32 in FIG. 1 and in slot 38 of the transmission in FIG. 3, a five slot message 38, 40, 42 for a different mobile station, then rather than reading all those slots, or even the next three required by its own PCH displacement instruction, it goes immediately, within the 0.02 second duration of balance of the first SPACH slot, to a low power state—since there can be no message for it there or in the remaining slots of that other message 38–42.

If, in this same example, station 10 detects in the first SPACH slot 38 a two-, three-, or four-slot message for another mobile station, then, according to the invention, station 10 will enter the low power state just for a corresponding number of slots, at 36 in FIG. 1. It then will power up and read the next slot required by its PCH displacement, at 28.

In the situation in which the station 10 has entered a low power state for the duration of another mobile station's page, at 36 in FIG. 1, and then emerges to read the next frame required by the PCH displacement at high power, at 28 in FIG. 1, if the next frame read as at 28 has no information for the station 10, then the station again determines, as at 44, whether the PCH displacement is exceeded by the message for the other station. If it is, then the station 10 enters the low power state 22 until the next paging channel is broadcast. If it is not, then decision point 26 is applied again to the message being broadcast.

Slight variations in the steps and devices used will not depart from the scope and spirit of the invention. All such variations as come within the scope of the appended claims come within the scope of this invention.

We claim as our invention:

1. A method for saving battery power in a first mobile communications device, wherein the device operates in a TDMA mode under TIA/EIA/IS-136 standards including paging channel displacement, the method comprising the steps of:

reading a paging channel and detecting a page continuation bit therein for a first device;

reading a first SPACH slot within the displacement of said paging channel, detecting a message for a different device, and determining the slot requirements for said message; and in the event that the displacement required for the slots of the message for the different device exceeds the remaining paging channel displacement, then entering a low power state for the first device until the time for reading the next paging channel.

2. The method of claim 1, further comprising the steps of:

in the event that the displacement for the slots of the message for the different device does not exceed the remaining paging channel displacement entering a low power state for the first device for the duration of the message for the different device, and then powering up the first device to read the next slot in the displacement of the paging channel.

3. A method for saving battery power in a first mobile communications device, wherein the device operates in a TDMA mode under TIA/EIA/IS-136 standards including paging channel displacement, the method comprising the steps of:

operating a first device in a power on state to detect a paging channel and an associated signal indicating that a deferred message for the first device will be sent;

detecting a message for a different device;

determining the number of SPACH frames required for the message for the different device and comparing it to the displacement remaining in the paging channel;

in the event that the number of frames and associated displacement required for the message for the different device is greater than the remaining paging channel displacement, having the first device enter a power state lower than said power on state until a next paging channel transmission is received; and in the event that the number of frames required for the message for the different device is not greater than the remaining paging channel displacement, having the first device enter a power state lower than said power on state for said number of frames and then having the first device return to said power on state to read the next frame of the paging channel.

4. A method for saving battery power in a digital mobile communications device, wherein the device operates in a TDMA mode under TIA/EIA/IS-136 standards including paging channel displacement, the method comprising the steps of:

reading at a first power level a paging channel in a broadcast signal that may be directed to a device;

if no page continuation bit for the device is detected, then reducing the power level of said device to a second, lower power level until the next paging channel occurs;

if a page continuation bit for the device is detected, then operating the device at the first higher power level and reading the first SPACH slot of the paging channel to determine if a first message is directed to the device;

if the first message is not directed to the device, determining the number of SPACH slots required for that message to a different device;

if the number of slots required for the message for the different device exceeds the remaining displacement of the paging channel, then reducing the power level of the device to said second level until the next paging channel occurs, and if the number of slots required for the message for the different device is less than the remaining displacement of the paging channel, then reducing the power level of the device to said second level during transmission of the SPACH slots for the message for the different device.

5. A method for reducing the power requirements of mobile telecommunication devices communicating in a TDMA mode under TIA/EIA/IS-36 communication standards, the method comprising the steps of:

selectively operating said devices to receive mobile communications in a powered up mode and to conserve power and not receive mobile communications in a reduced power sleep mode;

each device in the powered up mode reading a paging channel and determining whether the device has a pending message;

if a message is pending, the device continuing to operate in the powered up mode and determining whether its pending message starts with the first slot of a plurality of slots of the paging channel;

operating the device in said reduced power sleep mode to conserve power for the duration of the paging channel, if the duration of the slots required for a message to a different device is not less than the available duration of the paging channel; and operating the device in said reduced power sleep mode to conserve power for the duration of the time slots required for the message to the different device, if the duration of the slots required for the message to the different device is not greater than the available duration of the paging channel.

6. The method of claim 5, further including the steps of successively operating the device in the reduced power sleep mode for each set of slots within a paging channel that comprise a message for a different device, and operating the device in the powered up mode to read the first slot after each successive message within the paging channel.

7. A method for reducing the power requirements of mobile telecommunication devices communicating in a TDMA mode under TIA/EIA/IS-36 communication standards, the method comprising the steps of:

(a) defining at least one first communication device;

(b) applying power to said first device to allow the device to read its associated PCON bit at the start of a paging channel;

(c) reducing power to the first device for the duration of the paging channel if the PCON bit for the device is not set, and then repeating step (b) and subsequent steps;

(d) if the PCON bit for the first device is set in a paging channel, maintaining power for the device and reading the first slot of the paging channel which precedes a remaining displacement of the paging channel;

(e) if the first slot identifies a message for a different device that is not shorter than the remaining displacement of the paging channel, then reducing power for the first device for the duration of the paging channel and repeating step (b) and subsequent steps;

(f) if the first slot identifies a message for a different device that is shorter than the remaining displacement of the paging channel, then reducing power to the first device for the duration of this message and, when the message is completed, applying power to the first device, reading the first slot following the end of the message and repeating step (e) and subsequent steps.

* * * * *